US008662383B2

(12) United States Patent
Tajiri

(10) Patent No.: US 8,662,383 B2
(45) Date of Patent: Mar. 4, 2014

(54) IMAGE FORMING APPARATUS

(75) Inventor: Fumitake Tajiri, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 204 days.

(21) Appl. No.: 13/327,827

(22) Filed: Dec. 16, 2011

(65) Prior Publication Data

US 2012/0195665 A1 Aug. 2, 2012

(30) Foreign Application Priority Data

Jan. 31, 2011 (JP) ................................. 2011-018599

(51) Int. Cl.
*G06F 17/00* (2006.01)

(52) U.S. Cl.
USPC .......................................... 235/375; 235/383

(58) Field of Classification Search
USPC .......................... 235/375, 380, 383, 487, 492
See application file for complete search history.

(56) References Cited

U.S. PATENT DOCUMENTS

| | | | | |
|---|---|---|---|---|
| 5,814,796 | A * | 9/1998 | Benson et al. | 235/375 |
| 6,781,615 | B2 * | 8/2004 | Tsuruta | 347/213 |
| 7,051,928 | B2 * | 5/2006 | Kallin | 235/379 |
| 7,173,643 | B2 * | 2/2007 | Kubota et al. | 347/213 |
| 7,353,989 | B1 * | 4/2008 | Block et al. | 235/379 |
| 2007/0274753 | A1 | 11/2007 | Muto | |

FOREIGN PATENT DOCUMENTS

| | | | |
|---|---|---|---|
| JP | 2003-348280 | | 12/2003 |
| JP | 2005-255358 | | 9/2005 |
| JP | 2006-030776 | | 2/2006 |
| JP | 2006-030776 | A | 2/2006 |
| JP | 2006-110802 | | 4/2006 |
| JP | 2008-260618 | A | 10/2008 |
| JP | 2009-251072 | | 10/2009 |
| JP | 2010-114658 | | 5/2010 |

OTHER PUBLICATIONS

Notice of Reasons for Rejection in corresponding Japanese Patent Application No. 2011-018599 mailed Jan. 31, 2013.

* cited by examiner

*Primary Examiner* — Daniel St Cyr
(74) *Attorney, Agent, or Firm* — Banner & Witcoff, Ltd.

(57) ABSTRACT

An image forming apparatus includes a first paper feed discharge unit which feeds and discharges a recording medium; a second paper feed discharge unit which is formed with an opening and which feeds and discharges the recording medium via the opening; an image forming section which forms an image on the recording medium fed from the first paper feed discharge unit and the second paper feed discharge unit; a first transport mechanism which transports the recording medium from the first paper feed discharge unit to the image forming section; a second transport mechanism which connects the second paper feed discharge unit and the first transport mechanism and which transports the recording medium; a paper feed unit which feeds the recording medium or a storage type recording medium having a storage unit; a transport control unit which controls the first and second transport mechanisms.

25 Claims, 9 Drawing Sheets

IMAGE FORMING APPARATUS

CROSS REFERENCE TO RELATED APPLICATION

The present application claims priority from Japanese Patent Application No. 2011-018599, filed on Jan. 31, 2011, the disclosure of which is incorporated herein by reference in its entirety.

BACKGROUND OF THE INVENTION

1. Field of the Invention

The present invention relates to an image forming apparatus. In particular, the present invention relates to a transport technique for transporting, in an image forming apparatus, a recording medium which has a storage unit capable of performing data communication with a predetermined communication section.

2. Description of the Related Art

Conventionally, for example, a technique, which is disclosed in Japanese Patent Application Laid-open No. 2006-030776, is known as a transport technique for transporting, in an image forming apparatus, a recording medium which has a storage unit capable of performing data communication with a predetermined communication section. In Japanese Patent Application Laid-open No. 2006-030776, a transport method is described, wherein a sheet equipped with an RFID tag is prevented from passing through an image forming section including a fixing unit in relation to a technique in which an RFID tag reader/writer (communication section) is provided in a printer (image forming apparatus) and information is written into the RFID tag (storage unit) of the sheet (recording medium). In relation thereto, a technique is disclosed, wherein the printer is provided with an exclusively usable apparatus which has a transport passage installed with the reader/writer and the fed printing paper is discharged via a transport passage without passing through the image forming section if it is judged by the reader/writer that the fed printing paper is the sheet equipped with the RFID tag.

In Japanese Patent Application Laid-open No. 2006-030776, it is possible to preferably avoid the breakage of the IC tag which would be otherwise broken by the passage of the sheet equipped with the RFID tag through the fixing unit. However, if the exclusively usable transport passage, which does not pass through the image forming section, is provided in order to protect the IC tag as in Japanese Patent Application Laid-open No. 2006-030776, it is feared that the apparatus may be large-sized.

SUMMARY OF THE INVENTION

The present invention provides a technique in which a storage unit is protected while suppressing an image forming apparatus from being large-sized, when a function to perform the data communication with a recording unit possessed by a recording medium is added to the image forming apparatus.

According to a first aspect of the present invention, there is provided an image forming apparatus for forming an image on a recording medium, including: a first paper feed discharge unit which feeds and discharges the recording medium; a second paper feed discharge unit which is formed with an opening and which feeds and discharges the recording medium via the opening; an image forming section which forms the image on the recording medium fed from the first paper feed discharge unit and the second paper feed discharge unit; a first transport mechanism which transports the recording medium from the first paper feed discharge unit to the image forming section; a second transport mechanism which connects the second paper feed discharge unit and the first transport mechanism and which transports the recording medium; a paper feed unit which feeds the recording medium or a storage type recording medium having a storage unit; a transport control unit which controls the first and second transport mechanisms so that the storage type recording medium, which is fed by the paper feed unit, is transported to the first paper feed discharge unit or the second paper feed discharge unit via the second transport mechanism without passing through a specified portion disposed in the first transport mechanism ranging to the image forming section from a junction between the second transport mechanism and the first transport mechanism; and a communication section which performs data communication with the storage unit of the storage type recording medium.

According to a second aspect of the present invention, there is provided an image forming apparatus for forming an image on a recording medium, including: a first paper feed discharge unit which feeds and discharges the recording medium; a second paper feed discharge unit which is formed with an opening and which feeds and discharges the recording medium via the opening; an image forming section which forms the image on the recording medium fed from the first paper feed discharge unit and the second paper feed discharge unit; a first transport mechanism which transports the recording medium from the first paper feed discharge unit to the image forming section; a second transport mechanism which connects the second paper feed discharge unit and the first transport mechanism and which transports the recording medium toward the first transport mechanism; a third transport mechanism which is connected to at least one of the first transport mechanism and the second transport mechanism and which transports a storage type recording medium having a storage unit fed by a paper feed unit which is detachable with respect to the image forming apparatus; and a transport control unit which controls the first and second transport mechanisms so that the storage type recording medium, which is fed by the paper feed unit, is transported to the first paper feed discharge unit or the second paper feed discharge unit via the second transport mechanism without passing through a specified portion disposed in the first transport mechanism ranging to the image forming section from a junction between the second transport mechanism and the first transport mechanism, wherein: the paper feed unit includes a communication section which performs data communication with the storage unit of the storage type recording medium.

According to the image forming apparatus of the present invention, the transport mechanism is controlled so that the storage type recording medium is transported via the transport passage (transport route) which is used during the image formation and which does not pass through the image forming section, when the data communication is performed between the communication section and the storage unit possessed by the storage type recording medium. Therefore, the transport passage, which is used during the image formation and which does not pass through the image forming section, can be commonly used for the storage type recording medium and the ordinary recording medium. As a result, even if the function to perform the data communication with the storage unit possessed by the storage type recording medium is added to the image forming apparatus, it is possible to protect the storage unit while suppressing the apparatus from being large-sized.

DESCRIPTION OF THE PREFERRED EMBODIMENTS

First Embodiment

A first embodiment according to the present teaching will be explained with reference to FIGS. 1 to 4. A printer 10 is, for example, a color LED printer based on the direct tandem system for forming a color image by using four color toners (black K, yellow Y, magenta M, and cyan C). In the following description, it is assumed that the front is disposed on the left side (direction of the arrow X) in the horizontal direction with reference to FIG. 2. The image forming apparatus is not limited to the color LED printer based on the direct tandem system. The image forming apparatus may be, for example, a color laser printer, a monochrome or black and white laser printer, or a multifunction machine having the copy function or the like. Further, the image forming apparatus may be a printer based on the electrophotographic system or a printer based on the ink jet system.

Figure 1:
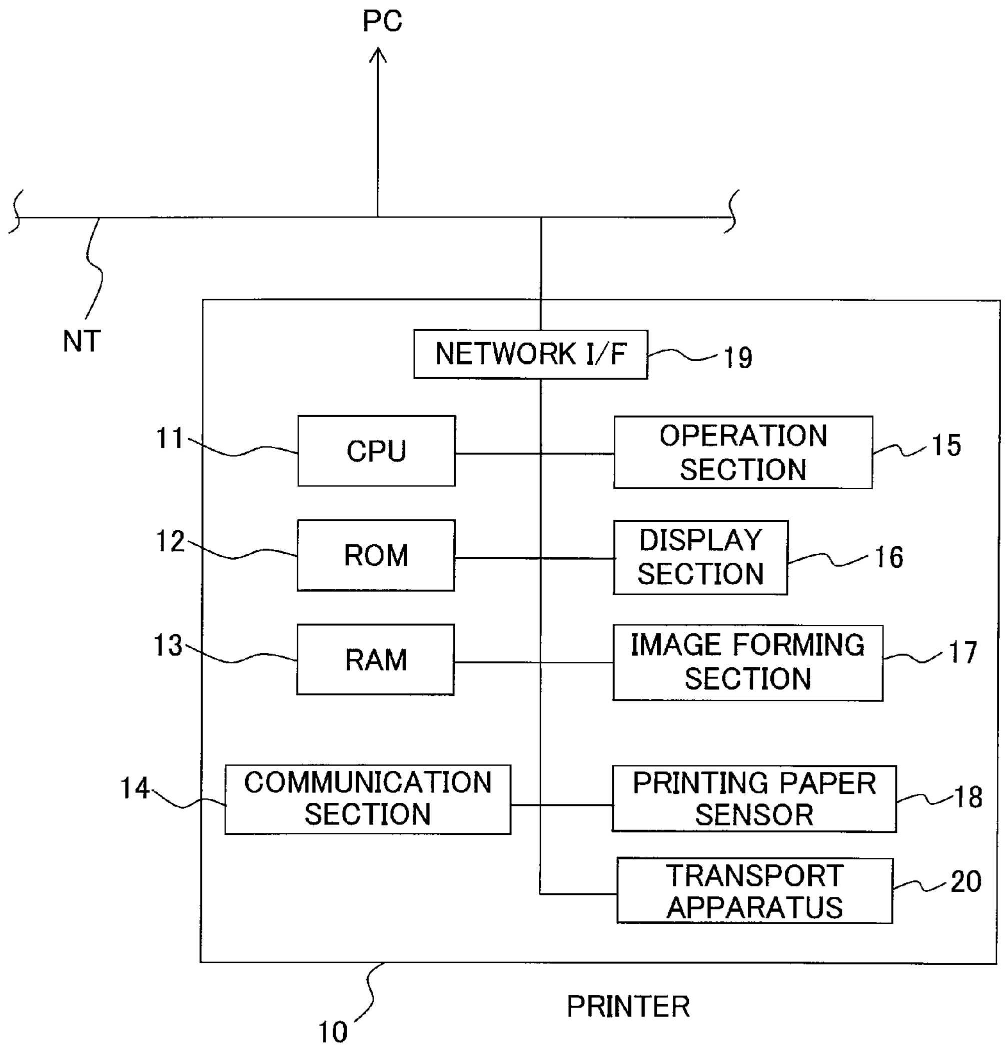
FIG. 1 shows a block diagram illustrating an electrical arrangement of a printing system according to an embodiment of the present invention.

As shown in FIG. 1, the printer 10 includes, for example, CPU 11 (example of the transport control unit, the judging unit, and the driving switching unit), ROM 12, RAM 13, a communication section 14, an operation section 15, a display section 16, an image forming section 17, printing paper sensors 18, a network interface 19, and a transport apparatus 20.

Various programs, which are provided to control the operation of the printer 10, are recorded in ROM 12. CPU 11 controls the operation of the printer 10 while storing the processing result in RAM 13, in accordance with the programs read from ROM 12.

In the first embodiment, the communication section 14 is provided on the upstream side of the auxiliary paper feed rollers 21 in a printing paper transport direction, and the communication section 14 performs the data communication with a storage unit of the electronic paper 5 described later on which is transported by the transport apparatus 20. The communication section 14 includes a writing unit for writing the image data into the storage unit of the electronic paper 5. Accordingly, the writing process can be performed with respect to the storage unit of the electronic paper 5 by using the communication section 14 as if an image is formed on the ordinary printing paper 3 by using the image forming section 17. The communication section 14 may further include a reading unit for reading the data from the storage unit of the electronic paper 5.

The operation section 15 is provided with a plurality of buttons, with which it is possible to perform various input operations including, for example, the printing instruction to perform the printing on the electronic paper 5 (data writing instruction) by the user. The display section 16 is provided with, for example, a liquid crystal display and lamps, with which it is possible to display, for example, various setting screens and operation states.

The image forming section 17 performs processes in relation to the image formation. The plurality of printing paper sensors 18 are provided to detect the positions of the respective sheets of the printing paper 3. For example, the printing paper sensor 18 is provided on the downstream side in the printing paper transport direction from each of registration rollers 22 to output the detection signal depending on the presence or absence of the printing paper 3. CPU 11 recognizes the position of the printing paper 3 in accordance with the detection signal supplied from the sensor 18, and CPU 11 controls various processes in relation to the image formation based on the position of the printing paper. The network interface 19 is connected to an external apparatus such as PC or the like via the communication line NT, with which it is possible to perform the data intercommunication.

Next, an explanation will be made with reference to FIG. 2 about the internal structure of the printer 10.

The printer 10 includes, for example, the image forming section 17 described above, the transport apparatus 20, a printing paper feed unit (example of the first paper feed discharge unit) 30, an MP (Multi Purpose) feed unit (example of the second paper feed discharge unit) 40, an electronic paper feed unit (example of the paper feed unit) 50, a discharge unit (example of the second paper feed discharge unit) 60, a reversing mechanism 70, a first transport passage P1, a second transport passage P2, a third transport passage P3, and a common transport passage CP.

The printing paper feed unit 30 is provided at a bottom portion of the printer 10, and the printing paper feed unit 30 includes a first tray T1 and a pickup roller 31. The ordinary printing paper (example of the recording medium and the recording medium having no storage unit) 3, which does not include the storage unit such as the RFID tag or the like, is principally accommodated in the first tray T1. The pickup roller 31 takes out the sheet of the ordinary printing paper 3 accommodated in the first tray T1 (hereinafter simply referred to as "ordinary printing paper") one by one.

The MP paper feed unit 40 is provided on the front surface of the printer 10. The MP paper feed unit 40 includes a multipurpose tray (example of the stacking unit; hereinafter referred to as "MP tray") 41, paper feed rollers (example of the paper feed member) 42, and an opening K1. When the manual feed printing is performed, the ordinary printing paper 3 is fed to the second transport passage P2 via the paper feed rollers 42 and the opening K1 of the MP paper feed unit 40. Further, the electronic paper 5 is discharged to the MP tray 41 from an electronic paper feed unit 50 via the paper feed rollers 42 and the opening K1. When the multipurpose tray 41 is not used, the multipurpose tray 41 is folded on the front surface of the printer 10 as depicted by dotted lines in FIG. 2.

The electronic paper feed unit 50 is provided under or below the printing paper feed unit 30. The electronic paper feed unit 50 includes a second tray T2 and a pickup roller 51. The electronic paper (example of the recording medium and the storage type recording medium) 5 is principally accommodated in the second tray T2. The pickup roller 51 takes out the sheet of the electronic paper 5 accommodated in the second tray T2 one by one.

The electronic paper 5 herein means the recording medium including the storage unit. The electronic paper 5 has the storage unit and the display section of the thin type, and the electronic paper 5 has a thin sheet-shaped form, wherein any image is not formed on the electronic paper 5 itself. That is, the electronic paper 5 makes it possible to form various images on the display section as if the images are printed, by rewriting the image data stored in the storage unit. It is herein assumed that the electronic paper 5 also includes the so-called RFID tag-equipped printing sheet which has the RFID tag wherein the image is formed on the paper itself.

The respective trays T1, T2 may be commonly used to accommodate the printing paper 3 and the electronic paper 5. That is, not only the printing paper 3 but also the electronic paper 5 may be accommodated in the first tray T1. In this case, the printing paper feed unit (first paper feed discharge unit) 30 also serves as the electronic paper feed unit 50 (paper feed unit), and it is possible to omit the electronic paper feed unit 50. Alternatively, not only the electronic paper 5 but also the printing paper 3 may be accommodated in the second tray T2. In this case, the electronic paper feed unit (paper feed unit) 50 also serves as the printing paper feed unit (first paper feed discharge unit) 30, and it is possible to omit the printing paper feed unit 30.

The first transport passage P1 is the transport passage which ranges from the first tray T1 to arrive at the image forming section 17. As shown in FIG. 2, the first transport passage P1 substantially corresponds to the route ranging from the pickup roller 31 of the printing paper feed unit 30 to the end portion of the image forming section 17 on the front side. The ordinary printing paper 3, which is fed from the printing paper feed unit 30, passes along the first transport passage P1 in order that the image is formed by the image forming section 17. For example, the first transport passage P1 and the pickup roller 31, the auxiliary paper feed rollers 21, 21, and the registration rollers 22, 22 arranged on the first transport passage correspond to the first transport mechanism of the present teaching.

Figure 2:
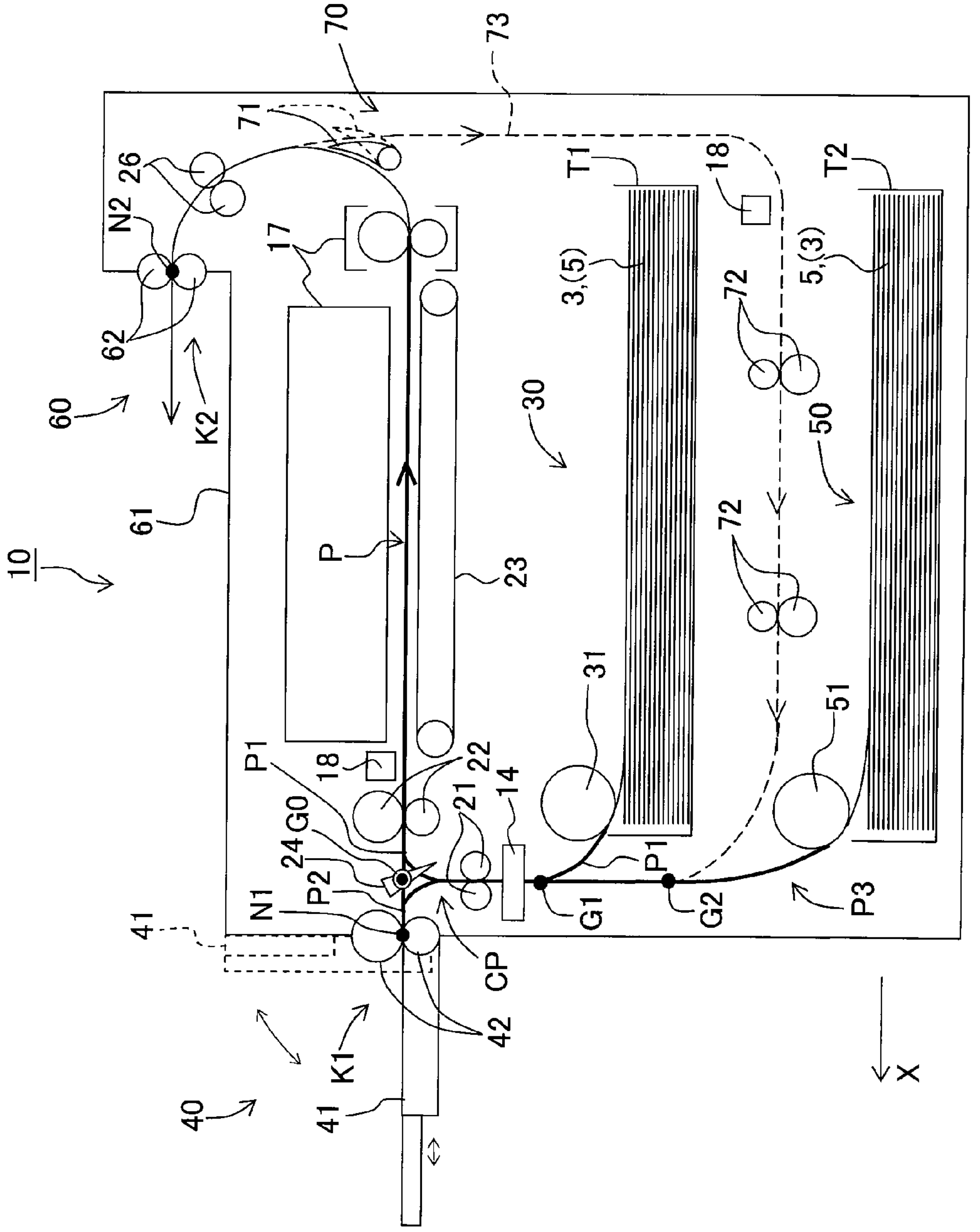
FIG. 2 schematically shows an internal structure of a printer according to a first embodiment.

As shown in FIG. 2, the second transport passage P2 corresponds to the route substantially ranging from the position N1 at which the two paper feed rollers 42, 42 are opposed to one another to a transport passage switching unit 24. The second transport passage P2 is connected to the first transport passage P1 at the transport passage switching unit 24. That is, the position of arrangement of the transport passage switching unit 24 corresponds to the junction G0 of the first transport passage P1 and the second transport passage P2. The second transport passage P2 is the route which is used when the image is formed on the printing paper 3 fed from the MP paper feed unit 40, i.e., when the manual feed printing is performed on the ordinary printing paper 3. In this way, the second transport passage P2 extends to make the connection from the MP paper feed unit 40 to the first transport passage P1, specifically to an intermediate position of the first transport passage P1. In the first embodiment, the ordinary printing paper 3, which is transported from the MP paper feed unit 40 toward the first transport passage P1, passes along the second transport passage P2. For example, the second transport passage P2 and the paper feed rollers 42, 42 arranged on the second transport passage correspond to the second transport mechanism of the present teaching.

As shown in FIG. 2, the third transport passage P3 corresponds to the route ranging from the pickup roller 51 of the electronic paper feed unit 50 to the merging point (junction) G1 with respect to the first transport passage P1. For example, the third transport passage P3 and the pickup roller 51 arranged on the third transport passage correspond to the third transport mechanism of the present teaching.

The route, which is included in the first transport passage P1 and which ranges from the merging point G1 between the first transport passage P1 and the third transport passage P3 extending from the electronic paper feed unit 50 to the transport passage switching unit 24 (junction G0), is referred to as "common transport passage CP". For example, the common transport passage CP and the auxiliary paper feed rollers 21, 21 arranged on the common transport passage CP correspond to the common transport mechanism of the present invention.

The image forming section 17 forms the image on the ordinary printing paper 3 which exists in the first transport passage P1 and which is transported via the second transport passage P2 or the printing paper feed unit 30. The image forming section 17 includes, for example, a developer accommodating unit 17*a*, a developing unit 17*b*, an image carrying unit 17*c*, and a transfer unit 17*d*, which are provided for each of the colors and a fixing device 17*e* (example of the fixing unit) (see FIG. 4). The image forming section 17 forms the image on the ordinary printing paper 3 in accordance with the electrophotographic system. That is, the image forming section 17 forms the image (monochrome or black and white image, color image) based on, for example, the printing data received from PC, at the predetermined printing position P on the ordinary printing paper 3 transported by a belt 23. The ordinary printing paper 3, on which the image has been formed, is subjected to the thermal fixation by means of the fixing device 17*e*. Further, the ordinary printing paper 3 is discharged onto a paper discharge tray 61 via a normal/reverse rotation roller 26 and paper discharge rollers 62.

The discharge unit 60 has the paper discharge tray (example of the paper discharge unit) 61, the paper discharge rollers (example of the paper discharge member) 62, and an opening K2. The ordinary printing paper 3, on which the image has been formed by the image forming section 17, is discharged to the paper discharge tray 61. When the ordinary printing paper 3 is subjected to the double-sided printing, the discharge unit 60 feeds the ordinary printing paper 3 to a reversing transport passage (portion indicated by arrows of dotted line shown in FIG. 2; example of the second transport passage) 73 via the opening K2.

The transport apparatus 20 transports the ordinary printing paper 3 or the electronic paper 5 in the printer 10. As shown in FIG. 2, the transport apparatus 20 includes, for example, the auxiliary paper feed rollers 21, 21, the registration rollers 22, 22, the transport belt 23, the transport passage switching unit (example of the switching member) 24, the normal/reverse rotation roller 26, and the reversing mechanism 70.

The auxiliary paper feed rollers 21, 21 transport, to the registration rollers 22, 22, the ordinary printing paper 3 taken out of the first tray T1 by means of the pickup roller 31. The registration rollers 22, 22 adjust the posture or attitude of the transported ordinary printing paper 3, and the ordinary printing paper 3 is fed onto the belt 23 at a predetermined timing.

The transport passage switching unit 24 switches the first transport passage P1 into the second transport passage P2 at the intermediate position of the first transport passage P1. In particular, the transport passage switching unit 24 switches the transport passage so that the electronic paper 5, which is transported through the common transport passage CP, is transported toward the second transport passage P2, if it is judged that the printing paper is the electronic paper 5 based on the printing paper judgment result brought about by CPU 11. That is, in the first embodiment, CPU 11 controls the transport passage switching unit (switching member) 24 so that the electronic paper 5, which is fed by the electronic paper feed unit (paper feed unit) 50, is transported to the MP paper feed unit (second paper feed discharge unit) 40 via the second transport passage P2 without passing through the specified portion disposed in the first transport passage P1 for connecting the image forming section 17 and the junction G0 at which the first transport passage P1 and the second transport passage P2 merge with each other. The specified portion disposed in the first transport passage P1 herein corresponds to the portion approximately ranging from the junction G0 to the end portion of the image forming section 17 on the front side as shown in FIG. 2. In this arrangement, CPU 11 controls the rotation of the paper feed rollers 42 so that the paper feed rollers 42 are rotated reversely to the case in which the ordinary printing paper 3 is fed from the opening K1 to the inside of the printer. In other words, in the first embodiment, CPU 11 controls the transport apparatus 20 so that the electronic paper 5, which is fed by the electronic paper feed unit 50, is transported to the MP paper feed unit 40 via the transport passage which is used when the image is formed and which does not pass through the image forming section 17.

The reversing mechanism 70 (example of the second transport mechanism) includes a flapper 71, a plurality of reversing transport rollers 72, a reversing transport passage 73, and paper discharge rollers 62, 62. The reversing transport passage 73 is indicated by the dotted line arrow portion shown in FIG. 2, which substantially ranges from the opposing position N2 of the two paper discharge rollers 62, 62 and the merging point G2 with respect to the third transport passage P3.

For example, when the ordinary printing paper 3 is subjected to the double-sided printing in accordance with the double-sided continuous system, then the image is printed on the back surface of the ordinary printing paper 3 (lower surface provided when the ordinary printing paper 3 is accommodated in the first tray T1) by means of the image forming section 17, and then the ordinary printing paper 3 is once transported to the paper discharge rollers 62. In accordance with the reverse rotation of the concerning paper discharge rollers 62 and the normal/reverse rotation roller 26, the ordinary printing paper 3 is transported via the flapper 71, the reversing transport passage 73, the plurality of reversing transport rollers 72, and the registration rollers 22, and the ordinary printing paper 3 is fed onto the belt 23 in such a state that the front and back surfaces are reversed or inverted. The image is printed on the front surface of the ordinary printing paper 3 (upper surface provided when the ordinary printing paper 3 is accommodated in the first tray T1) by means of the image forming section 17, and then the ordinary printing paper 3 is discharged onto the paper discharge tray 61. The reversing mechanism 70 is not necessarily an indispensable element, which may be omitted.

Figure 3A:
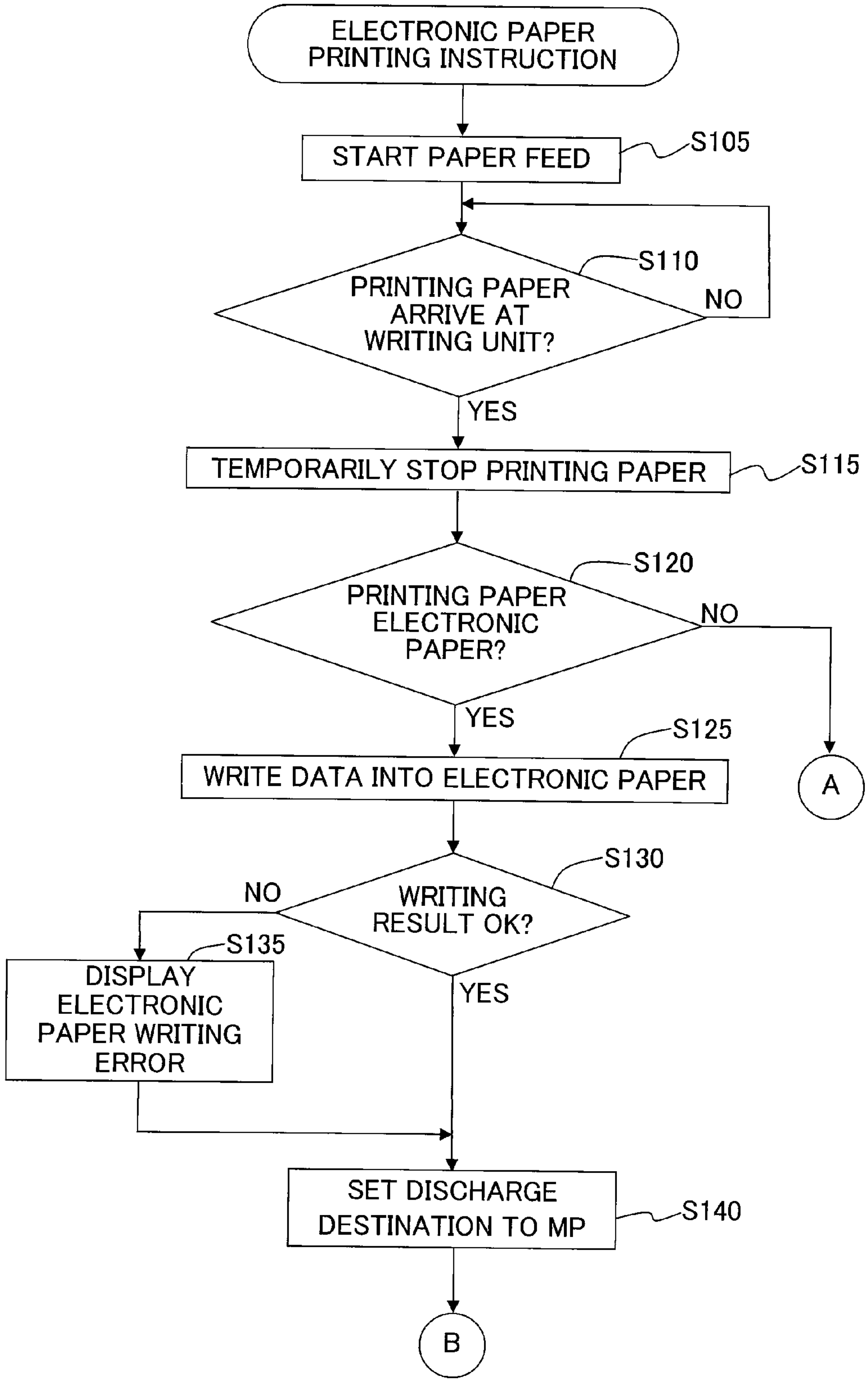
FIG. 3A and FIG. 3B show a flow chart schematically illustrating a printing process for performing the printing on the electronic paper.
Figure 3B:
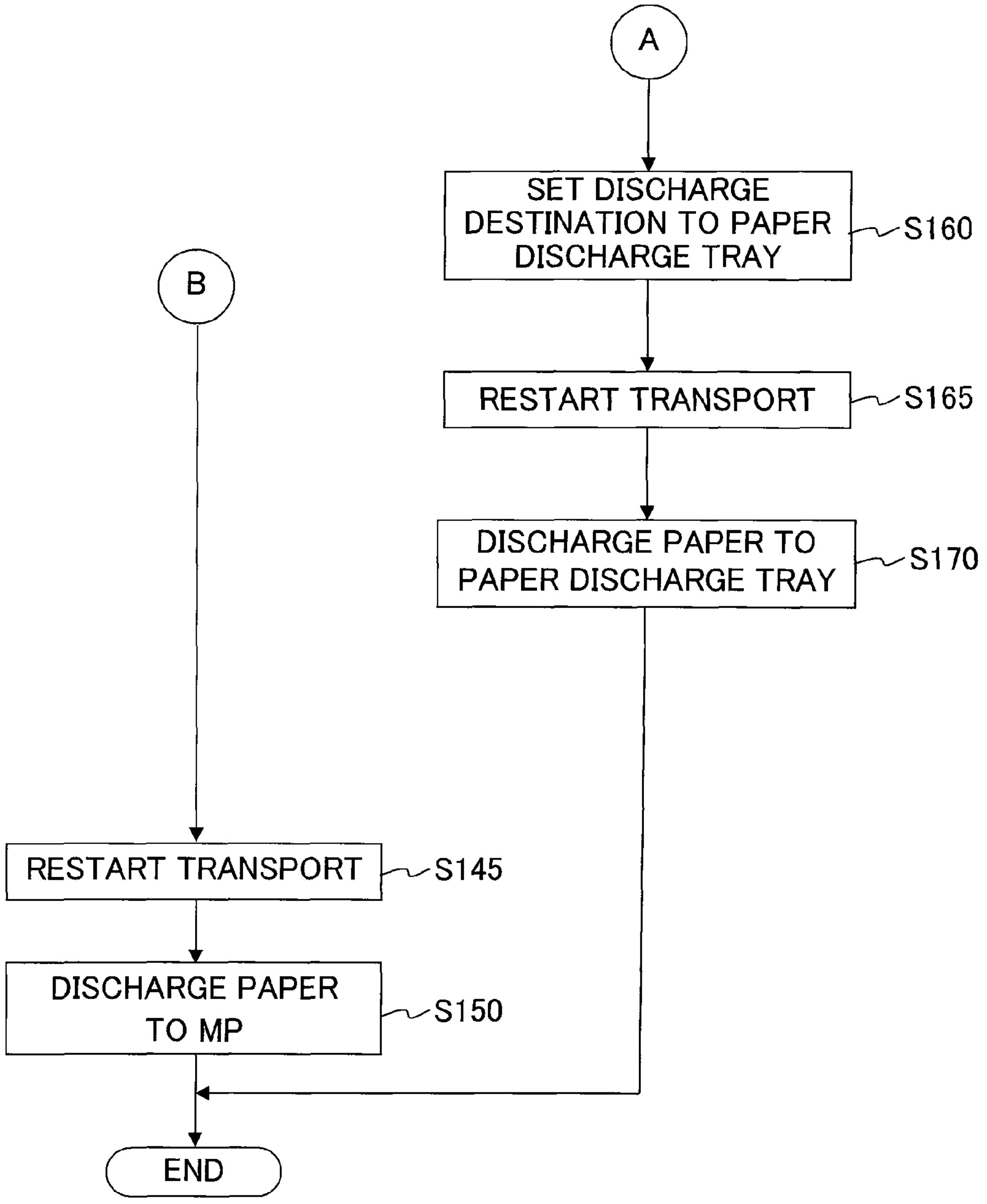
Figure 4:
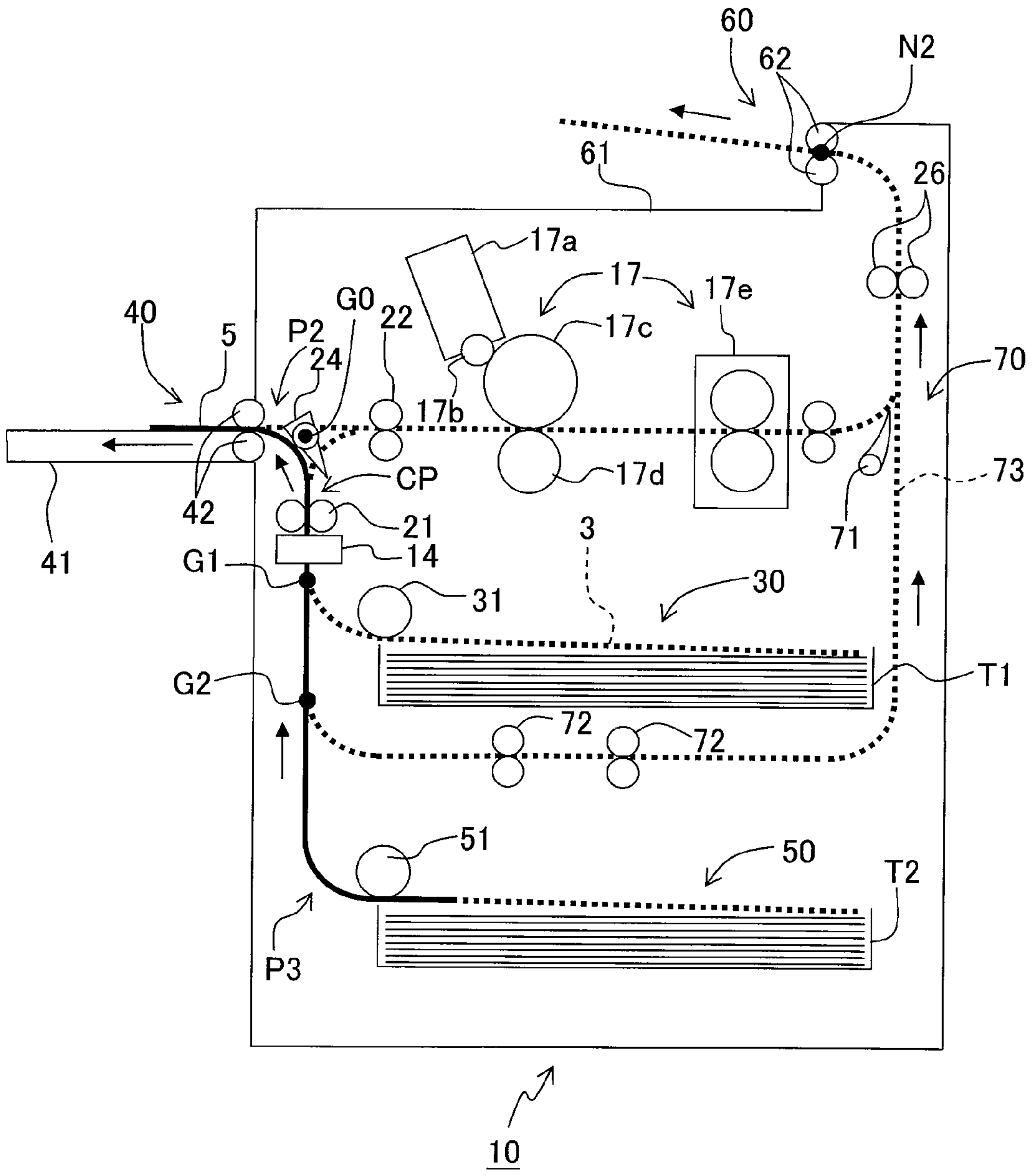
FIG. 4 illustrates a transport passage for the electronic paper in the first embodiment.

Next, an explanation will be made about the printing process for the electronic paper 5 in the first embodiment with reference to FIGS. 3A, 3B and 4.

The electronic paper printing process is executed by CPU 11 in accordance with a predetermined program stored in ROM 12, for example, when the instruction of the electronic paper printing is performed by a user by the aid of the operation section 15.

When the electronic paper printing instruction is performed, CPU 11 firstly controls the pickup roller 51 of the electronic paper feed unit 50 to start the feeding of the printing paper from the second tray T2 (Step S105). Subsequently, it is judged whether or not the printing paper arrives at the writing unit, i.e., the communication section 14 (Step S110). The judgment to judge whether or not the printing paper arrives at the communication section 14 is performed, for example, depending on whether or not the printing paper sensor for detecting the printing paper, which is provided for the communication section 14, detects the printing paper.

If it is judged that the printing paper arrives at the communication section 14 (Step S110: YES), then CPU 11 stops the rotation of the pickup roller 51 to temporarily stop the feeding of the printing paper (Step S115), and CPU 11 judges whether or not the printing paper is the electronic paper 5 (Step S120). The judgment to judge whether or not the printing paper is the electronic paper 5 is performed, for example, by judging whether or not the communication section 14 successfully performs the data communication with the printing paper fed by the electronic paper feed unit 50. That is, the electronic paper 5 can perform the data communication with the communication section 14 in order to rewrite the data in the storage unit (perform the printing). Therefore, for example, CPU 11 allows the communication section 14 and the electronic paper 5 to perform the data communication therebetween in order to recognize the electronic paper 5, and CPU 11 receives the communication result from the communication section 14. Thus, CPU 11 can judge whether or not the printing paper is the electronic paper 5.

If it is judged that the printing paper is the electronic paper 5 (Step S120: YES), CPU 11 writes the writing image data into the storage unit of the electronic paper 5 by the aid of the communication section 14 (Step S125). Subsequently, it is judged whether or not the writing into the storage unit of the electronic paper 5 is performed normally (Step S130). This judgment is performed, for example, by judging whether or not the writing image data before the writing is coincident with the image data read from the storage unit of the electronic paper 5 by the communication section 14 after the writing.

If it is judged that the writing into the storage unit of the electronic paper 5 is performed normally (Step S130: YES), then the discharge destination of the electronic paper 5 is set to the MP paper feed unit (second paper feed discharge unit) 40 (Step S145), and the transport of the electronic paper 5 is restarted (Step S145). In this procedure, CPU 11 controls the transport passage switching unit 24 of the transport apparatus 20, and the first transport passage P1 is switched into the second transport passage P2 at the intermediate position of the first transport passage P1 (see FIG. 4). Accordingly, the electronic paper 5 is transported to the MP paper feed unit (second paper feed discharge unit) 40 via the second transport passage P2. Further, CPU (driving switching unit) 11 controls the rotation driving unit (not shown) of the paper feed rollers 42 so that the paper feed rollers 42 are rotated reversely to the case in which manual feed printing is performed, and the electronic paper 5 is discharged to the MP tray 41 (Step S150).

On the other hand, if it is judged that the writing into the storage unit of the electronic paper 5 is not performed normally (Step S130: NO), then CPU 11 allows, for example, the display section 16 of the printer 10 to display an information in relation to the electronic paper writing error, and the routine proceeds to Step S140 to discharge the electronic paper 5 from the MP tray 41.

If it is judged in Step S120 that the printing paper fed from the electronic paper feed unit 50 is not the electronic paper 5, i.e., if it is judged that the printing paper is the ordinary printing paper 3, then CPU 11 sets the discharge destination of the ordinary printing paper 3 to the paper discharge tray 61 (Step S160), and the transport of the ordinary printing paper 3 is restarted (Step S165). In this procedure, CPU 11 controls the transport passage switching unit 24 of the transport apparatus 20 so that the printing paper transport passage is maintained to be the first transport passage P1 as it is. That is, CPU 11 controls the transport apparatus 20 so that the ordinary printing paper 3 is discharged to the paper discharge tray 61 via the first transport passage P1. Accordingly, the ordinary printing paper 3 is discharged to the paper discharge tray 61 via the paper discharge rollers 62 and the opening K2 (Step S170). That is, if the ordinary printing paper 3 is fed from the electronic paper feed unit 50 against the intention of the user due to any cause or factor, the ordinary printing paper 3 is discharged to the paper discharge tray 61 without being subjected to the printing process.

When the printing (data rewriting) process is performed for a plurality of sheets in accordance with the electronic paper printing instruction, the processes ranging from Step S105 to Step S170 are repeated until the printing process is completed for a predetermined number of sheets.

Effect of First Embodiment

When the data communication is performed between the communication section 14 and the storage unit possessed by the electronic paper 5, the electronic paper 5 is transported to the MP paper feed unit 40 via the first transport passage P1 (specifically a part thereof) and the second transport passage P2. Therefore, it is possible to commonly use the transport passages P1, P2 which are used when the image is formed and which do not pass through the image forming section 17. That is, it is unnecessary to provide any distinct transport passage in order to perform the printing (data communication) of the electronic paper 5. Therefore, when the function to perform the data communication with the storage unit possessed by the electronic paper 5 is added to the printer 10, it is possible to protect the storage unit while suppressing the apparatus from being large-sized.

Second Embodiment

Figure 5:
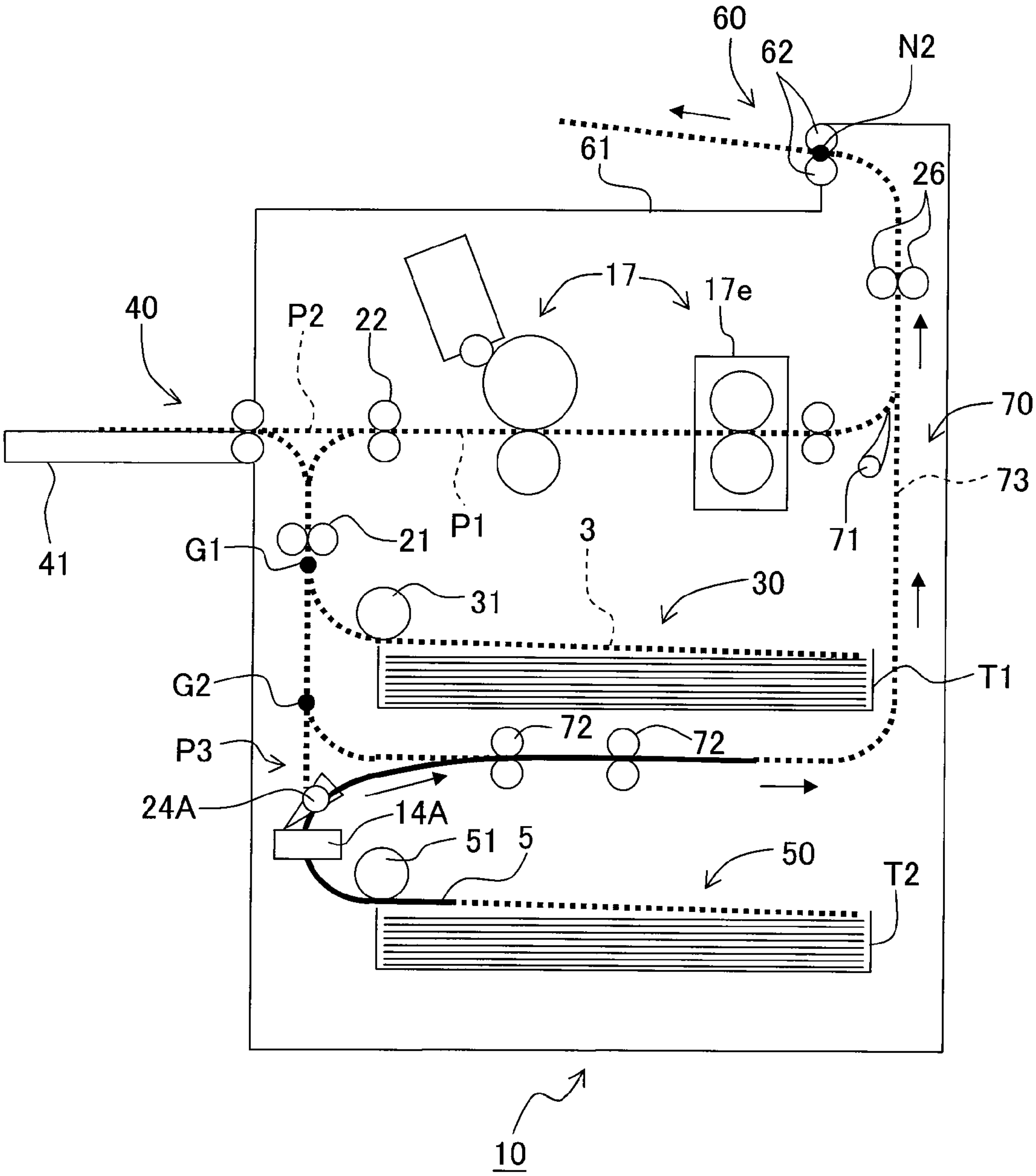
FIG. 5 illustrates a transport passage for the electronic paper in a second embodiment.

Next, a second embodiment according to the present teaching will be explained with reference to FIG. 5. Only different features or points, which are different from those of the first embodiment, will be explained. The same members as those of the first embodiment are designated by the same reference numerals of the members, any explanation of which will be omitted.

In the first embodiment, the electronic paper 5 is discharged to the MP paper feed unit 40. However, in the second embodiment, as shown in FIG. 5, the electronic paper 5 is discharged onto the paper discharge tray 61 via the reversing transport passage 73. That is, in the second embodiment, the reversing transport passage 73 corresponds to the second transport passage, and the discharge unit 60 corresponds to the second paper feed discharge unit.

Therefore, in the second embodiment, the installation places of a transport passage switching unit 24A (second switching unit) and a communication section 14A are different from those in the first embodiment. As shown in FIG. 5, the transport passage switching unit 24A and the communication section 14A are provided in the third printing paper transport passage P3 between the pickup roller 51 of the second tray T2 and the passage merging point G2.

In this arrangement, CPU 11 judges whether the printing paper fed from the electronic paper feed unit (third feed unit) 50 is the ordinary printing paper 3 or the electronic paper 5, for example, according to the communication result of the communication section 14A. The transport passage switching unit 24A performs the following operation in accordance with the control of the CPU 11. That is, if the concerning printing paper is the ordinary printing paper 3, the transport passage, along which the printing paper fed from the electronic paper feed unit 50 is transported, is switched into the first transport passage P1. If the concerning printing paper is the electronic paper 5, the transport passage is switched into the reversing transport passage 73. In this procedure, CPU 11 rotates the reversing transport rollers 72 in the directions opposite to those provided during the printing on the second surface of the printing paper (front surface of the printing paper) when the ordinary printing paper 3 is subjected to the double-sided printing.

In the second embodiment, the electronic paper 5 is discharged via the reversing transport passage 73. Therefore, the MP paper feed unit 40 is not necessarily an indispensable element, which may be omitted.

Effect of Second Embodiment

Even when the electronic paper 5 is discharged onto the paper discharge tray 61 via the reversing transport passage 73, it is possible to commonly use the transport passage P2 which is used when the image is formed and which does not pass through the image forming section 17. Therefore, it is possible to protect the storage unit of the electronic paper 5 while suppressing the apparatus from being large-sized, in the same manner as in the first embodiment.

The electronic paper 5 is discharged via the reversing transport passage 73. Therefore, even in the case of any printer which is not provided with the MP paper feed unit 40, it is possible to appropriately discharge the electronic paper 5.

The paper discharge tray 61 is provided on the upper surface of the printer, the reversing transport passage 73 passes under or below the printing paper feed unit 30, and the electronic paper feed unit 50 is positioned under or below the reversing transport passage 73 which passes under or below the printing paper feed unit 30. Therefore, the reversing transport passage 73 is not lengthened uselessly, and it is possible to efficiently transport the electronic paper 5 via the reversing transport passage.

Third Embodiment

Figure 6:
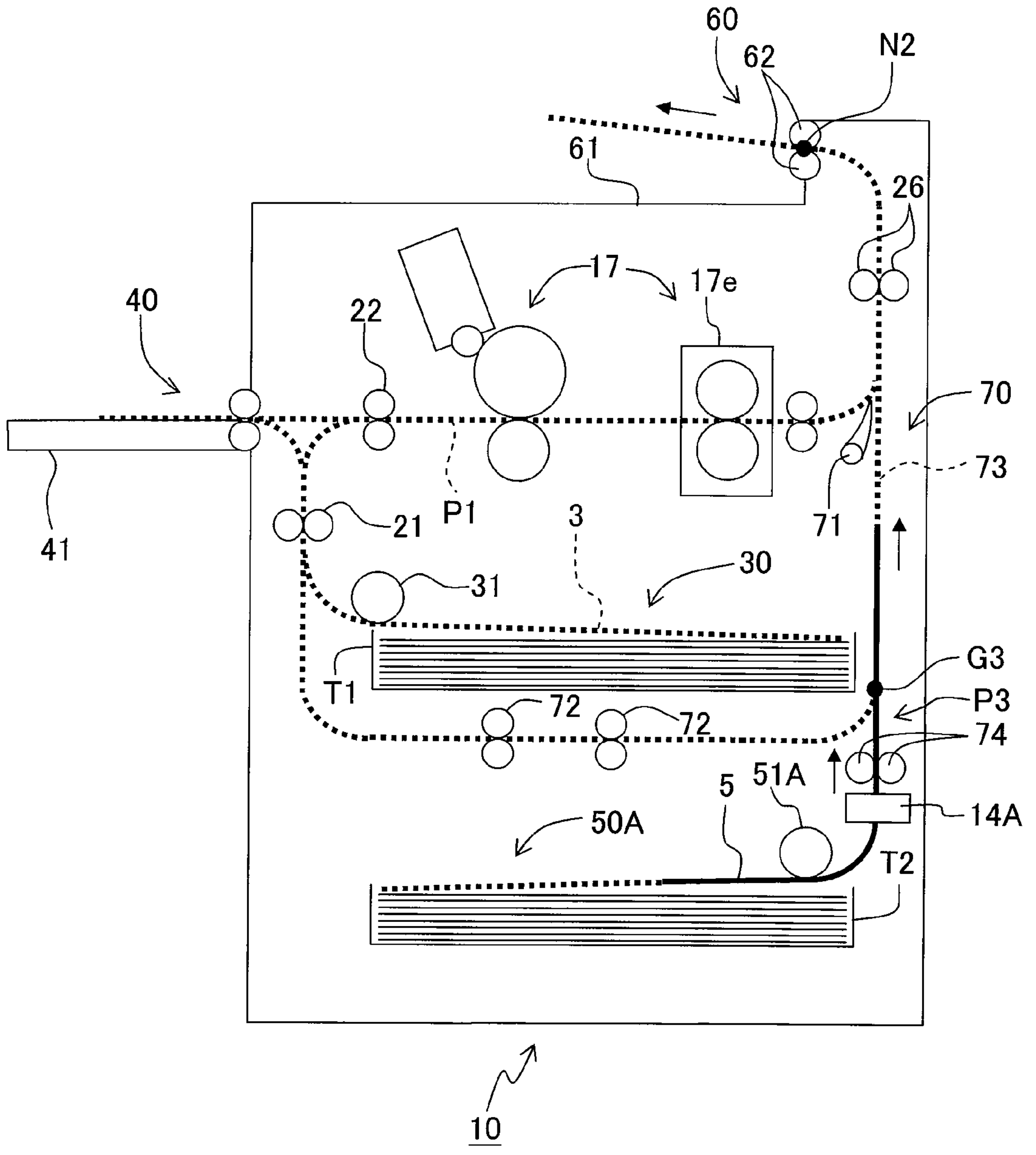
FIG. 6 illustrates a transport passage for the electronic paper in a third embodiment.

Next, a third embodiment according to the present teaching will be explained with reference to FIG. 6. Only different features or points, which are different from those of the first embodiment, will be explained. The same members as those of the first embodiment are designated by the same reference numerals of the members, any explanation of which will be omitted.

In the third embodiment, the electronic paper 5 is discharged onto the paper discharge tray 61 via the reversing transport passage 73, in the same manner as in the second embodiment. However, the electronic paper 5 is picked up at a different place or position, by means of a pickup roller 51A of an electronic paper feed unit 50A. That is, in the third embodiment, the pickup roller 51A is provided at a rearward portion of the electronic paper feed unit 50A. A communication section 14A is also provided at a rearward portion of the printer 10. Auxiliary paper feed rollers 74, 74, which transport the electronic paper 5 picked up by the pickup roller 51A toward the paper discharge tray 61 via the reversing transport passage 73, are provided, for example, on the downstream side of the communication section 14A in the printing paper transport direction. Therefore, the third transport passage P3 is disposed at a rearward portion of the printer 10. The third transport passage P3 merges with the reversing transport passage 73 at the merging point G3 disposed at the rearward position of the printer 10. The picked up electronic paper 5 is fed to the reversing transport passage 73 at the paper feed merging point G3. That is, in the third embodiment, the electronic paper feed unit (paper feed unit) 50A is constructed to feed the electronic paper 5 to only the reversing transport passage 73, and the transport passage switching unit 24 is not provided.

In this arrangement, the electronic paper feed unit 50A is exclusively used for the electronic paper, and thus it is possible to omit the transport passage switching unit (switching member) 24. Therefore, the structure or arrangement of the printer 10 is simplified.

Other Embodiments

The present teaching is not limited to the embodiments having been explained based on the description and the drawings described above. For example, the following embodiments are also included in the technical scope of the present teaching.

In the first embodiment, CPU 11 controls the transport mechanism 20 so that the electronic paper 5, which is fed by the electronic paper feed unit 50, is transported to the MP paper feed unit 40 via the transport passage which is used during the image formation and which does not pass through the image forming section 17. However, there is no limitation thereto. For example, it is also allowable to control the transport mechanism 20 so that the electronic paper 5, which is fed by the electronic paper feed unit 50, is transported to the printing paper feed unit 30. In this arrangement, the following procedure is available. That is, the electronic paper 5, which is fed from the electronic paper feed unit 50, is transported toward the MP paper feed unit 40 in the same manner as in the first embodiment, and then the paper feed rollers 42 are rotated in the directions to be brought about when the manual feed printing is performed to transport the electronic paper 5 to the printing paper feed unit 30 via the first transport passage P1. Accordingly, it is possible to transport the electronic paper 5 via the transport passage which is used during the image formation and which does not pass through the image forming section 17.

Figure 7:
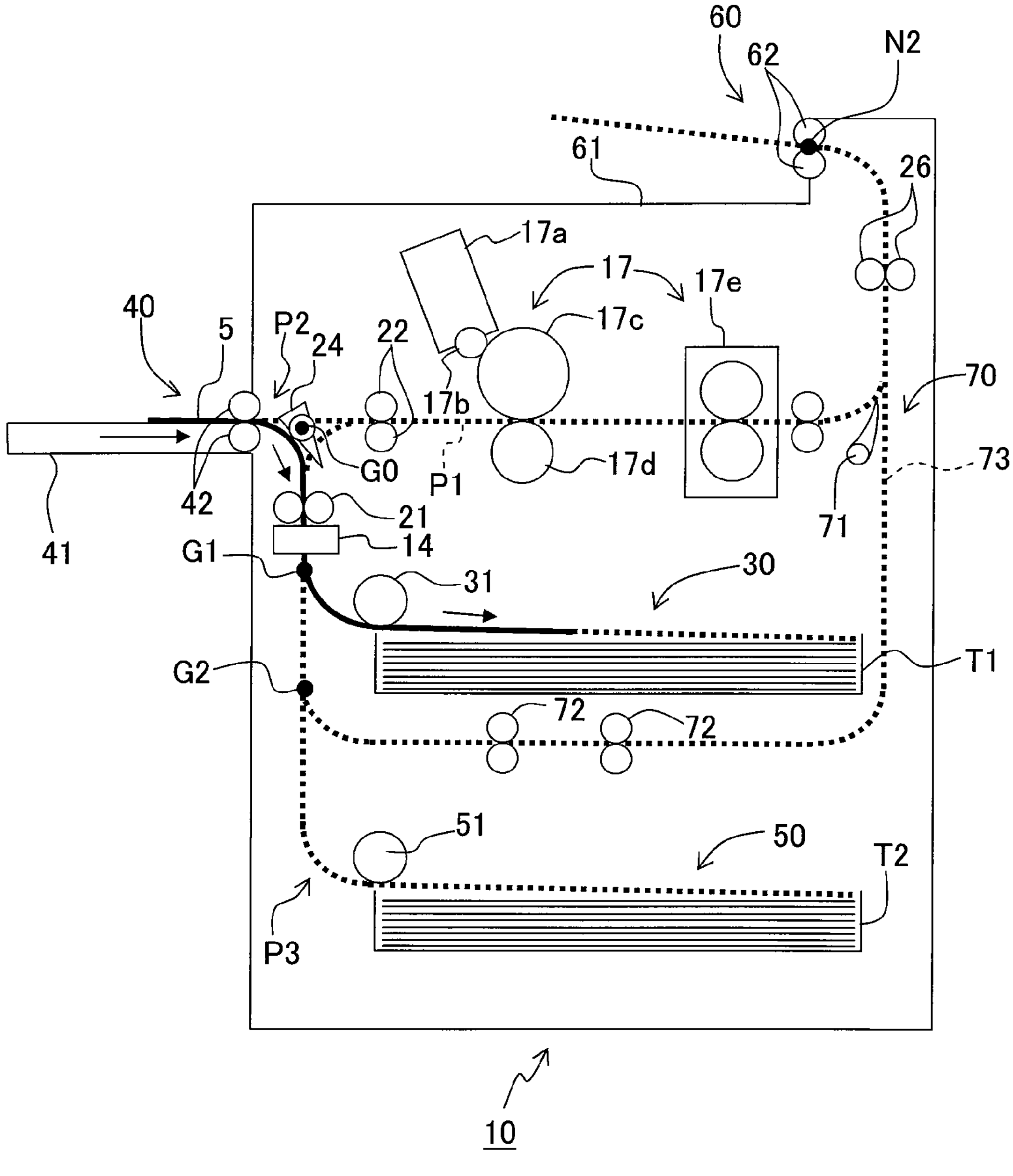
FIG. 7 illustrates a transport passage for the electronic paper in another embodiment.

In the first embodiment, as shown in FIG. 7, the MP paper feed unit (second paper feed discharge unit) 40 may also serve as the electronic paper feed unit (paper feed unit). In this arrangement, CPU 11 may perform the operation on the basis of the judgment result by the aid of the communication section 14 so that the electronic paper (storage type recording medium) 5 is transported to the printing paper feed unit (first paper feed discharge unit) 30 via the second transport passage P2. In this arrangement, the electronic paper 5, for which the data communication is intended to be performed with the communication section 14, can be set to the MP tray 41. Further, if the data is confidential, the electronic paper 5 to which the confidential data is recorded can be stored in the printing paper feed unit 30 in the printer.

Each of the embodiments is illustrative of the exemplary case in which CPU (judging unit) 11 judges whether or not the printing paper fed by the electronic paper feed unit 50 is the electronic paper 5, by judging whether or not the communication section 14 successfully performs the data communication with the printing paper. However, there is no limitation thereto. For example, it is also allowable to judge whether or not the printing paper is the electronic paper 5 as follows. That is, a paper feed unit, which is exclusive for the electronic paper, is provided, and it is judged whether or not the paper feed unit exclusive for the electronic paper is selected when the paper feed unit is selected by the user. Even in this case, it is possible to appropriately judge whether or not the printing paper is the electronic paper 5, unless the ordinary printing paper or the like is erroneously stored in the paper feed unit exclusive for the electronic paper.

Alternatively, it is also allowable to provide a contact unit with which the electronic paper 5 makes the electrical contact with respect to the communication section 14, and it is judged whether or not the electrical contact can be made with the electronic paper 5. In this arrangement, it is possible to distinguish the storage type recording medium from the recording medium having no storage unit by providing the contact unit which makes it possible to make any electrical contact of the communication section 14 with respect to the electronic paper 5 and which can detect that the printing paper is the electronic paper 5. Therefore, the judgment can be reliably performed even if the paper feed unit may possibly feed both of the storage type recording medium and the recording medium having no storage unit. The contact unit may be, for example, a wireless communication section capable of making the communication with the communication section 14.

Figure 8:
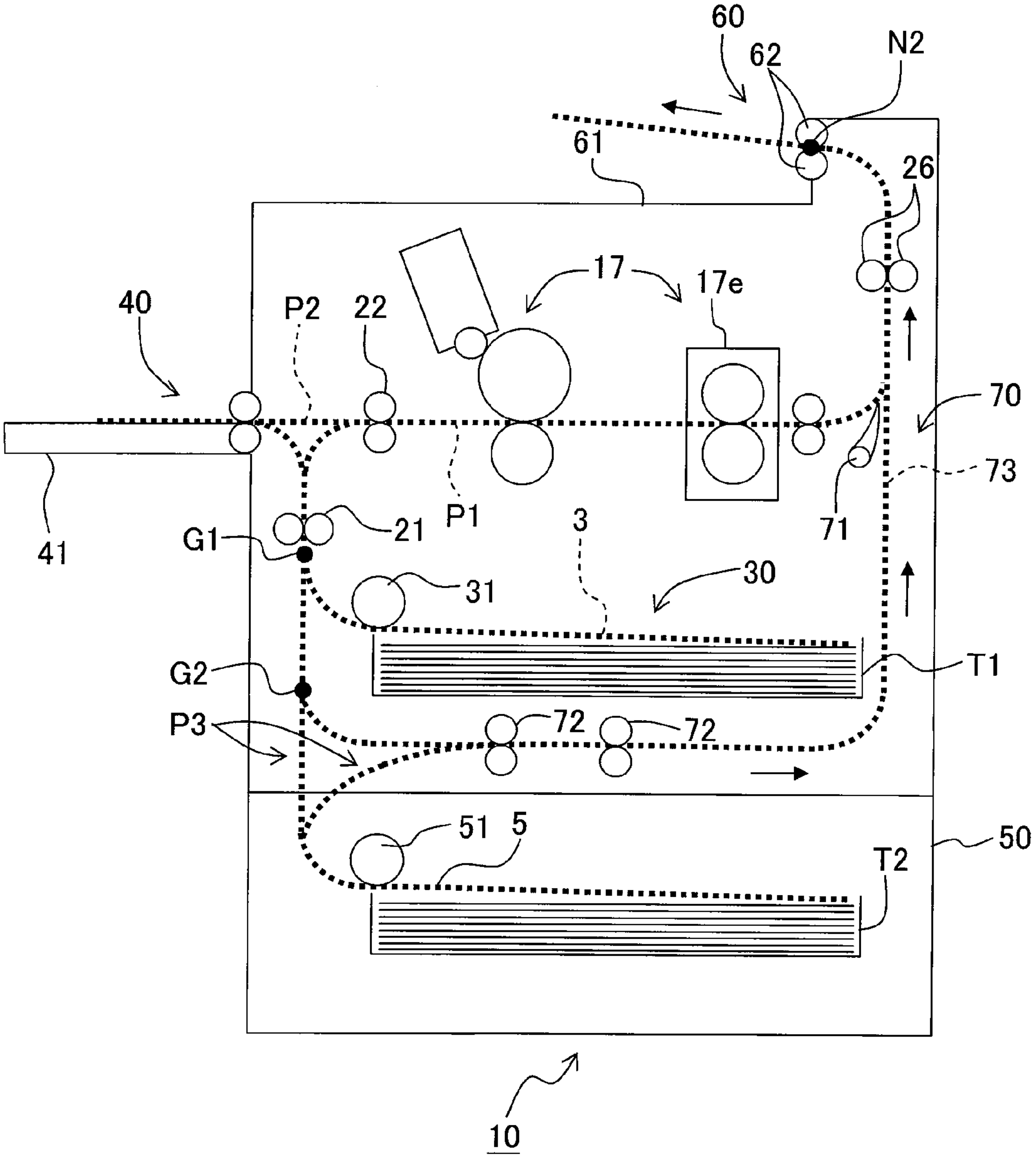
FIG. 8 illustrates a transport passage for the electronic paper in still another embodiment.

In the respective embodiments, the electronic paper feed unit (paper feed unit) 50 is constructed internally. However, there is no limitation thereto. For example, as shown in FIG. 8, the electronic paper feed unit 50 may be constructed externally (as an option part), which is detachable with respect to the printer 10. In this arrangement, the printer 10 is provided with the third transport passage P3 which is connectable to the first transport passage P1 or the reversing transport passage (second transport passage) 73, wherein the electronic paper 5, which is fed by the externally connected electronic paper feed unit 50, is transported along the third transport passage P3. CPU (transport control unit) 11 may control the transport unit 20 so that the electronic paper (storage type recording medium) 5, which is fed by the electronic paper feed unit 50, is transported to the first paper feed discharge unit 30 or the second paper feed discharge unit 40, 60 via the second transport passage P2 without passing through the specified portion disposed in the first transport passage which connects the image forming section and the merging point at which the first transport passage P1 and the second transport passage P2 merge with each other.

In this arrangement, in the second embodiment, it is desirable that the communication section 14A and the transport passage switching unit 24A are provided in the electronic paper feed unit 50. In the third embodiment, it is also desirable that the communication section 14A and the auxiliary paper feed rollers 74, 74 are provided in the electronic paper feed unit 50.

In the respective embodiments, the MP paper feed unit 40, which includes the paper feed rollers 42 capable of performing the automatic paper feed, is shown as the example of the second paper feed discharge unit. However, there is no limitation thereto. It is appropriate for the second paper feed discharge unit that the opening is provided and the recording medium is fed via the opening. For example, a so-called manual paper feed unit is also available, in which the user feeds the recording medium by inserting the recording medium until arrival at the registration rollers 22 via the opening.

What is claimed is:

1. An image forming apparatus for forming an image on a recording medium, comprising:

a first paper feed discharge unit configured to feed and discharge the recording medium;

a second paper feed discharge unit which is formed with an opening and which is configured to feed and discharge the recording medium via the opening;

an image forming section configured to form the image on the recording medium fed from the first paper feed discharge unit and the second paper feed discharge unit;

a first transport mechanism configured to transport the recording medium from the first paper feed discharge unit to the image forming section;

a second transport mechanism which connects the second paper feed discharge unit and the first transport mechanism and which is configured to transport the recording medium;

a paper feed unit configured to feed the recording medium or a storage type recording medium having a storage unit;

a transport control unit configured to control the first and second transport mechanisms so that the storage type recording medium, which is fed by the paper feed unit, is transported to the first paper feed discharge unit or the second paper feed discharge unit via the second transport mechanism without passing through a specified portion disposed in the first transport mechanism, the specified portion from a junction between the second transport mechanism and the first transport mechanism to the image forming section; and a communication section configured to perform data communication with the storage unit of the storage type recording medium.

2. The image forming apparatus according to claim 1, wherein the second paper feed discharge unit is a multipurpose paper feed discharge unit.

3. The image forming apparatus according to claim 1, further comprising:

a judging unit configured to judge whether the paper feed unit feeds the storage type recording medium or the recording medium.

4. The image forming apparatus according to claim 3, wherein the transport control unit is configured to control the first transport mechanism to transport the recording medium to the image forming section, in a case that the judging unit judges that the paper feed unit feeds the recording medium.

5. The image forming apparatus according to claim 3, wherein the judging unit is configured to judge that the paper feed unit feeds the storage type recording medium, if any paper feed unit, which exclusively feeds the storage type recording medium, is selected as the paper feed unit.

6. The image forming apparatus according to claim 3, wherein:

the storage type recording medium has a contact unit configured to electrically contact the communication section; and the judging unit is configured to judge that the paper feed unit feeds the storage type recording medium, if the paper feed unit feeds the storage type recording medium and thus the communication section can make electrical contact with the storage type recording medium fed by the paper feed unit.

7. The image forming apparatus according to claim 6, wherein the judging unit judges that the paper feed unit feeds the storage type recording medium, in a case that the communication section can perform the data communication with the storage type recording medium fed by the paper feed unit.

8. The image forming apparatus according to claim 3, wherein the transport control unit is configured to control the first and second transport mechanisms to transport the storage type recording medium to the second paper feed discharge unit, in a case that the judging unit judges that the paper feed unit feeds the storage type recording medium.

9. The image forming apparatus according to claim 8, wherein:

the second paper feed discharge unit includes a paper feed member configured to transport, toward the first transport mechanism, the recording medium via the opening;

the first transport mechanism includes a common transport mechanism configured to commonly transport the recording medium fed from the first paper feed discharge unit and the storage type recording medium or the recording medium fed from the paper feed unit; and the image forming apparatus further comprises a switching member configured to swithc between whether the storage type recording medium or the recording medium, which is transported by the common transport mechanism, is transported toward the second transport mechanism based on a judgment result of the judging unit.

10. The image forming apparatus according to claim 9, wherein the second paper feed discharge unit further includes a stacking unit configured to stack the recording medium fed via the opening.

11. The image forming apparatus according to claim 10, further comprising a driving switching unit configured to drive and rotate the paper feed member so that the storage type recording medium, which is transported by the second transport mechanism, is discharged from the opening to the stacking unit.

12. The image forming apparatus according to claim 8, wherein:

the second paper feed discharge unit is a paper discharge unit configured to stack the recording medium on which the image has been formed by the image forming section;

the second transport mechanism is a reversing transport mechanism configured to transport the recording medium toward the first transport mechanism again by reversing the recording medium before the recording medium, on which the image has been formed by the image forming section, is discharged to the discharge unit; and the transport control unit is configured to control the reversing transport mechanism to transport the storage type recording medium to the paper discharge unit by the reversing transport mechanism, in a case that the judging unit judges that the paper feed unit feeds the storage type recording medium.

13. The image forming apparatus according to claim 12, wherein:

the paper discharge unit is provided on an upper surface of the image forming apparatus;

a part of the reversing transport mechanism is positioned under or below the first paper feed discharge unit; and the paper feed unit is further positioned under or below the part of the reversing transport mechanism.

14. The image forming apparatus according to claim 13, further comprising:

a second switching member configured to direct the recording medium to the first transport mechanism in a case that the judging unit judges that the paper feed unit feeds the recording medium and to direct the storage type recording medium to the reversing transport mechanism in a case that the judging unit judges that the paper feed unit feeds the storage type recording medium.

15. The image forming apparatus according to claim 14, wherein the paper feed unit includes a second switching member, and the paper feed unit is detachable with respect to the image forming apparatus.

16. The image forming apparatus according to claim 13, further comprising an auxiliary paper feed roller configured to transport the storage type recording medium toward the reversing transport mechanism, wherein the paper feed unit is configured to feed the storage type recording medium toward only the reversing transport mechanism.

17. The image forming apparatus according to claim 16, wherein the paper feed unit includes the auxiliary paper feed roller, and the paper feed unit is detachable with respect to the image forming apparatus.

18. The image forming apparatus according to claim 3, wherein:

the second paper feed discharge unit also serves as the paper feed unit and includes a stacking unit is configured to control the recording medium to be fed via the opening; and the transport control unit is configured to control the first and second transport mechanisms to transport the storage type recording medium to the first paper feed discharge unit, in a case that the judging unit judges that the second paper feed discharge unit feeds the storage type recording medium.

19. The image forming apparatus according to claim 1, wherein the image forming section is an electrophotographic image forming section which includes a fixing unit for heating and fixing the image formed on the recording medium.

20. The image forming apparatus according to claim 1, wherein the storage type recording medium has a display section configured to display an image based on image data stored in the storage unit.

21. The image forming apparatus according to claim 20, wherein the communication section includes a writing unit configured to write the image data into the storage unit of the storage type recording medium fed by the paper feed unit.

22. The image forming apparatus according to claim 1, wherein the paper feed unit is detachable with respect to the image forming apparatus.

23. The image forming apparatus according to claim 22, wherein the paper feed unit includes the communication section.

24. An image forming apparatus for forming an image on a recording medium, comprising:

a first paper feed discharge unit configured to feed and discharge the recording medium;

a second paper feed discharge unit which is formed with an opening and configured to feed and discharge the recording medium via the opening;

an image forming section configured to form the image on the recording medium fed from the first paper feed discharge unit and the second paper feed discharge unit;

a first transport mechanism configured to transport the recording medium from the first paper feed discharge unit to the image forming section;

a second transport mechanism which connects the second paper feed discharge unit and the first transport mechanism and which is configured to transport the recording medium toward the first transport mechanism;

a third transport mechanism which is connected to at least one of the first transport mechanism and the second transport mechanism and which is configured to transport a storage type recording medium having a storage unit fed by a paper feed unit which is detachable with respect to the image forming apparatus; and a transport control unit configured to control the first and second transport mechanisms so that the storage type recording medium, which is fed by the paper feed unit, is transported to the first paper feed discharge unit or the second paper feed discharge unit via the second transport mechanism without passing through a specified portion disposed in the first transport mechanism, the specified portion ranging from a junction between the second transport mechanism and the first transport mechanism to the image forming section, wherein:

the paper feed unit includes a communication section configured to perform data communication with the storage unit of the storage type recording medium.

25. The image forming apparatus according to claim 24, wherein the image forming section is an electrophotographic image forming section which includes a fixing unit for heating and fixing the image formed on the recording medium.

* * * * *